United States Patent [19]

Friedrich

[11] Patent Number: 5,704,537
[45] Date of Patent: Jan. 6, 1998

[54] METHOD FOR SHEATHING A PLASTIC TUBE WITH A METAL SHEATHING

[75] Inventor: Emil Heinrich Friedrich, Weinheim, Germany

[73] Assignee: Hewing GmbH, Ochtrup, Germany

[21] Appl. No.: 539,116

[22] Filed: Oct. 4, 1995

[30] Foreign Application Priority Data

Apr. 29, 1995 [DE] Germany ............ 195 15 853.9

[51] Int. Cl.⁶ .................. B23K 31/02; B23K 101/04
[52] U.S. Cl. .................. 228/148; 228/150; 228/173.3
[58] Field of Search ..................... 228/129, 130, 228/148, 150, 173.3

[56] References Cited

U.S. PATENT DOCUMENTS

| 499,657 | 6/1893 | Coffin | 228/130 |
|---|---|---|---|
| 2,714,447 | 8/1955 | Gardes | 228/130 |
| 2,945,942 | 7/1960 | Flynn et al. | 228/173.3 |
| 2,975,087 | 3/1961 | Donald | 228/148 |
| 3,327,383 | 6/1967 | Reed | 228/130 |

FOREIGN PATENT DOCUMENTS

| 0639411 | 3/1994 | European Pat. Off. . | |
|---|---|---|---|
| 874393 | 4/1953 | Germany | 228/129 |
| 2045973 | 9/1970 | Germany . | |
| 2923544 | 6/1979 | Germany . | |
| 3225869 | 7/1982 | Germany . | |

OTHER PUBLICATIONS

Abstract for DE 4310272-A (Jun. 1994); (WPAT) Accession No. 94-311064/39.

*Primary Examiner*—P. Austin Bradley
*Assistant Examiner*—Jeffrey T. Knapp
*Attorney, Agent, or Firm*—Birch, Stewart, Kolasch & Birch, LLP

[57] ABSTRACT

In a method for sheathing a plastic tube with a metal sheathing, a metallic band (20) is laid around a plastic tube (14), the metallic band (20) comprising longitudinal edges (32) bent to a common side thereof, which are, when the metallic band (20) is laid around the plastic tube (14), in abutment and extend substantially parallel to the longitudinal axis of the plastic tube (14) and are welded together. The volume of the bent longitudinal edges (32) and the welding energy are chosen such that the metallic band (20) welded together at its longitudinal edges comprises, in the region of the longitudinal seam (46), an outer surface (50) lying substantially within the outer peripheral surface (48) of the metal sheathing after welding.

10 Claims, 3 Drawing Sheets

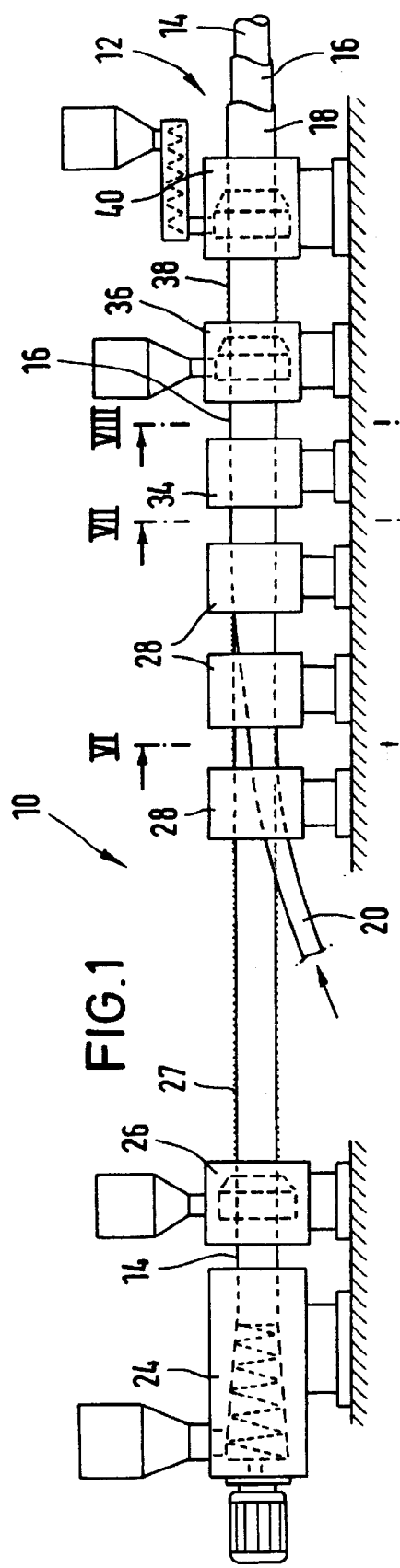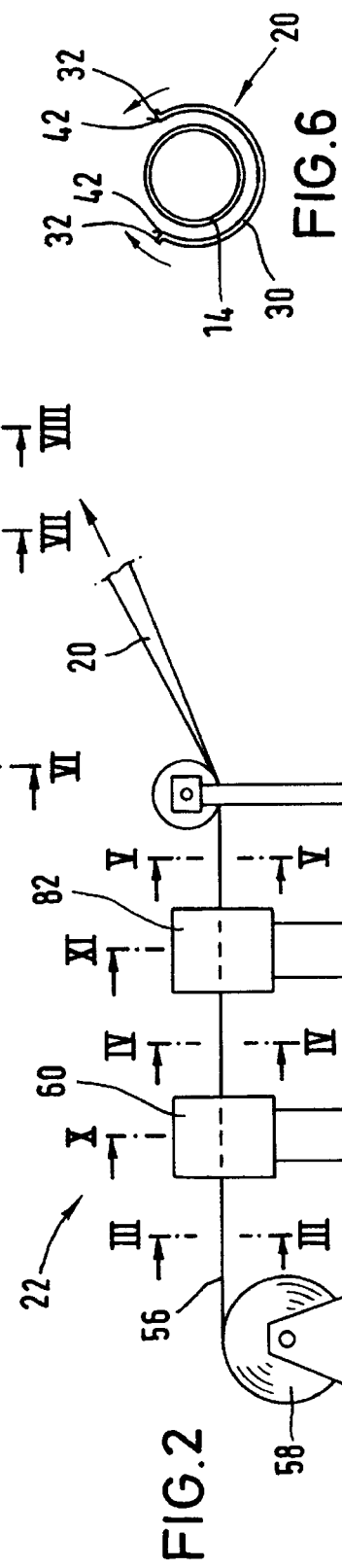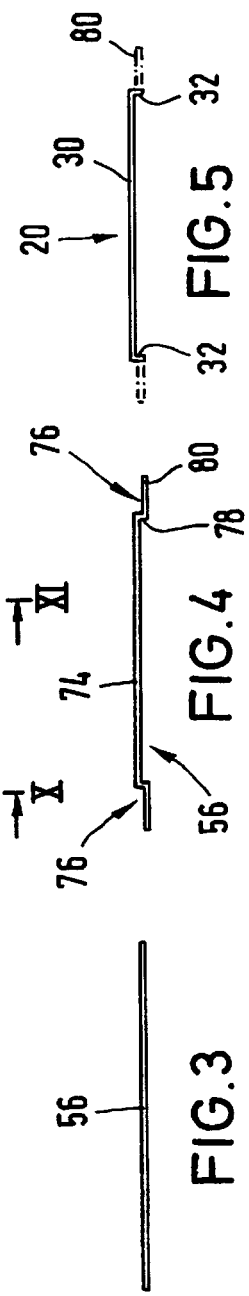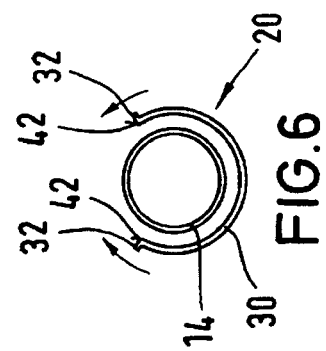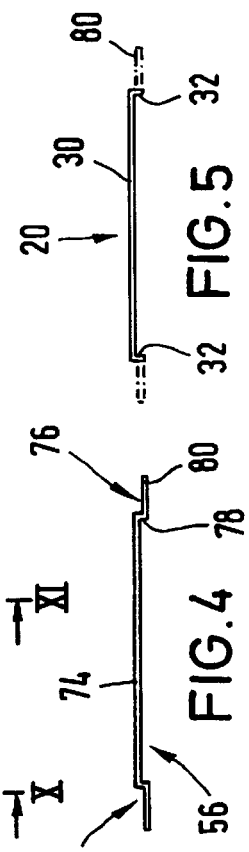

METHOD FOR SHEATHING A PLASTIC TUBE WITH A METAL SHEATHING

BACKGROUND OF THE INVENTION

The invention relates to a method for sheathing a plastic tube with a metal sheathing, wherein a metallic band is laid around a plastic tube, the said metallic band comprising longitudinal edges bent to one side thereof, which are, when the metallic band is laid around the plastic tube, in abutment and extend substantially parallel to the longitudinal axis of the plastic tube, and are welded together.

For the production of plastic-metal-compound tubes, it is among other things required to non-positively mold a metallic band around a plastic inner tube. After sheathing the plastic inner tube with the metallic band, another plastic tube is extruded thereon from the outside. Such a compound tube unites the advantages of a pure plastic tube and a metal tube by comprising the flexibility of a plastic tube and being an as good diffusion barrier as a metal tube due to the metal intermediate layer.

Methods for producing plastic-metal-compound tubes are known, e.g., from DE 20 45 973 A1, DE 29 23 544 C2, DE 32 25 869 A1.

A problem with the sheathing of a plastic tube with a metallic band is the connection of the longitudinal edges of the metallic band after it has been laid around the plastic tube. Mostly, the longitudinal edges of the metallic band are welded together for this purpose. The problem consists in that there is a danger of damaging the plastic tube due to welding.

From prior art, it is known that the longitudinal edges of the metallic band laid around the plastic tube overlap each other and are welded together. It is known from the above-mentioned DE 29 23 544 C2 to weld together the abutting longitudinal edges of the metallic band. This, however, requires a quite precise process control and guidance of both the metallic band and the abutting longitudinal edges of the metallic band.

In DE 20 45 973 A1 and DE 32 25 869 A1 mentioned above as well, it is suggested for the production of a metal tube from a metallic band to bend the longitudinal edges of the metallic band toward one side thereof to then shape the thus molded metallic band to a tube, the bent longitudinal edges abutting. In this state, the longitudinal edges are welded together at their free ends. The welded joint exclusively extends in the region of the free ends of the longitudinal edges; in the remaining region of the longitudinal edges, particularly at their transitions to the intermediate middle section of the metallic band, they are therefore not connected with each other. This means that the weld does not extend over the entire height of the longitudinal edges. The radial projection consisting of the longitudinal edges still remaining after the welding is folded down. In this region, the metal tube—as, by the way, a metallic band molded to a tube by overlapping longitudinal edges as well—comprises a thickening and thus an irregular cross section which is undesirable.

SUMMARY OF THE INVENTION

It is the object of the present invention to provide a method for sheathing a plastic tube with a metal sheathing where an aftertreatment of the longitudinal seam along which the bent longitudinal edges of the metal band are welded together is not required.

In order to achieve such object, the invention suggests a method for sheathing a plastic tube with a metal sheathing of the above-mentioned kind in which the volume of the bent longitudinal edges and the welding energy are chosen such that the metallic band welded together at its longitudinal edges comprises, in the region of the longitudinal edge, an outer surface lying in the outer peripheral surface of the remaining metallic band.

According to the invention, it is provided to mutually adapt the "welding volume" and the welding energy in a certain manner, for it is to be achieved that the bent longitudinal edges are connected to each other, on the one hand, and that the radial projection resulting from the bent longitudinal edges is "welded down". The welding volume is determined by the height of the longitudinal edges and the thickness thereof, i.e., by the thickness of the metallic band. The welding energy introduced into the weld seam is dependent, on the one hand, on the energy released by the welding device and the speed of the relative movement between welding device and metallic band. Therefore, the welding energy per advance unit path must be chosen depending on the welding volume such that the longitudinal edges are welded down to the outer peripheral surface of the remaining metallic band after the welding process, which means that no considerable outer projection of the metallic sheathing is noticeable after the welding in spite of the bent longitudinal edges.

By means of the method of the invention, it becomes possible to reduce the thickness of the metallic band, which typically is made of aluminum, to about half the thickness of the aluminum metallic bands used for plastic-metal-compound tubes at present. Owing to the upstanding longitudinal edges, a sufficiently large abutting surface is obtained which is even sufficient when the longitudinal edges of the metallic band comprise wavy radial offsets when seen over the length of the compound tube, which occurs in practice. On the one hand, the longitudinal edges of the metallic band provide a sufficient material amount or volume for forming a weld seam root (bead-like projection directed inwards), which does not project inwards too far, but is nevertheless sufficiently marked and has only small bilateral notches adjacent the metallic band, and, on the other hand, such a small material volume that no considerable radial projection is noticeable after the welding. The entire material of the longitudinal edges is melted and used for making the longitudinal weld seam and thus for producing an intimate connection of the lateral end portions of the middle section of the metallic band. Moreover, the bent longitudinal edges have the advantage to be able to better guide the metallic band until the welding process is performed.

A decisive advantage of the method according to the invention is to be seen in that the adaptation of welding energy and welding volume results in the production of a weld seam having neither considerable protrusions to the outside nor to the inside. The latter has the advantage that the already finished inner tube experiences no or only a negligible cross-sectional deformation in the region of the weld seam. The merely small protrusion to the outside does in no way impair the application of the plastic layer for the outer tube which thus is also uniform in the cross section over 360°.

The main advantage of the method according to the invention is to be seen in that a mechanical finishing of the longitudinal seam of the metallic band can be dispensed with. This, by the way, also applies to the metal sheathing itself, for the metallic band welded and laid around the plastic tube does not require any recalibration or diameter reduction. The reason therefor is to be seen particularly in that the metallic band, due to the bent longitudinal edges, may lie closer to the plastic inner tube in the region of the weld seam than is the case with mutually overlapping longitudinal edges or abutting longitudinal edges, since the welding device may have a greater distance to the plastic inner tube due to the projecting longitudinal edges. Thus, the influence of heat on the inner tube is reduced when welding the longitudinal edges; therefore, the metallic band may lie rather close against the inner tube even in the seam region. Through the cooling of the metallic band performed subsequent to the welding, the latter shrinks, which further improves the engagement between plastic tube and metallic band.

Advantageously, the welding energy and the welding volume are set such that the weld seam comprises a suitably small flat protrusion on its outside, which slightly projects (preferably up to about ⅒ through ⅕ of the metallic band thickness) over the (imagined) extension of the outer (cylinder) surface formed by the metallic band middle section. Preferably, the welding root comprises two protrusions having located a recessed portion therebetween. At its deepest, the recessed portion is located in about the extension of the inner peripheral surface of the metallic band inner section. The two protrusions arranged laterally thereof project inwardly by about ⅕ of the metallic band thickness.

Alternatively, the welding energy and the welding volume are adapted to each other in such a manner that a flattening arises on the outside of the weld seam and the welding root has a protrusion opposite to the weld seam.

As mentioned above, the longitudinal edges of the metallic band are bent towards one side. The middle section of the metallic band extends between the two longitudinal edges. The angles at which the two longitudinal edges of the metallic band are folded may be different, the sum of both angles amounting to about 180°. If the two angles are equal, i.e. about 90° each, the longitudinal edges radially project when the metallic band is laid around the plastic tube.

An advantageous development of the invention provides that the projecting longitudinal edges are formed by forming a smooth metallic band. To this end, the metallic band is passed through at least one molding station. This molding station comprises two molding rolls supported so as to be rotatable about parallel rotational axes and having peripheral surfaces opposite to each other. The metallic band to be deformed is introduced into the clearance between the peripheral or molding surfaces of these two molding rolls, so that the previously undeformed metallic band comprises bent longitudinal edges.

The deformation of the metallic band can either be effected continuously in a continuous operation (for which particularly a molding station of the above-described kind is used) or discontinuously by supplying length sections of the metallic band to a molding tool and deforming them sectionwise.

For the production of longitudinal edges, it is advantageous to initially give stepped longitudinal sides to the metallic band. This stepping is advantageously provided such that the cross section of the metallic band Bas a Z-like configuration between its middle section and the longitudinal sides when regarding the cross section. At each side of the middle section, the middle section of the metallic band has adjacent thereto an angularly projecting angular section from which, in turn, an edge section extends which is substantially parallel to the middle section of the metallic band. This means that, viewed in cross section, the metallic band comprises a raised or, depending on the orientation of the metallic band, a lowered deepened middle section which is limited at both sides thereof by projecting L-shaped flanges comprising angular sections adjacent to which there are edge sections parallel to the middle section and facing away from each other. The angular sections producible in this manner may be extremely short, i.e., the height offset between the middle section and the edge sections of the metallic band can be chosen to be extremely small. Through a trimming procedure in a trimming station following this deforming procedure, the edge sections are separated from the angular sections. Thus, the molded metallic band is finished which now just consists of the middle section and the adjacent angular sections on both sides thereof, which form the bent longitudinal edges which abut each other for welding the metallic band.

In particular, the trimming device is a cutting tool with a rotating knife or cutting edge engaging on an outer surface of the angular section to separate the edge section immediately adjacent the angular section. The outer surfaces of the angular sections are those surfaces of the angular sections which are arranged to face away from each other. In contrast thereto, the inner surfaces of the angular sections face each other. During trimming, the metallic band is supported by an abutment in the middle section and in the angular section. Preferably, this abutment is a counter roll whose rotational axis extends parallel to the axis of the rotating knife of the cutting roll. In its axial end portions, the counter roll comprises a stepping. Each stepping shows itself as a reduction in diameter, the reduction in diameter being chosen so as to be equal to the height of the angular section of the metallic band, i.e. equal to the offset between middle section and edge section of the metallic band and the axial extension of the offset being chosen so as to be equal to the thickness of the metallic band in the angular section, i.e. equal to the metallic band thickness.

With the above method, namely the production of a stepped metallic band with a raised or deepened middle section and edge sections offset therefrom as well as the subsequent trimming of the metallic band by separating the edge sections, it is possible to manufacture a metallic band with extremely short projecting longitudinal edges. The deformation of the metallic band can be effected continuously as a continuous operation or discontinuously and thus intermittently. The metallic band can also be molded in a deep-drawing operation.

The sheathed plastic inner tube produced according to the above method can serve as intermediate step in the production of a plastic-metal-plastic compound tube. Subsequent to the sheathing of the plastic inner tube, another plastic layer forming the plastic outer tube is deposited onto the sheathing. Intermediate the plastic inner tube and the metal sheathing as well as intermediate the metal sheathing and the plastic outer tube, further plastic layers, which are adhesive layers, can be applied. Due to the fact that the weld seam already flattens after the welding without mechanical aftertreatment, the outer contour of which is about approximated to the peripheral surface of the metallic band in the middle section thereof, the subsequent application of plastic layers for adhesive purposes as well as for the production of the outer tube is possible without any problem, closed layers being always produced without there being a necessity for applying an excessive amount of plastic material in the region of the longitudinal seam. This means that the outer layers can really be configured rather thin, these layers even comprising a sufficient size, i.e. thickness, in the region of the longitudinal seam.

BRIEF DESCRIPTION OF THE DRAWINGS

Hereinafter, an embodiment of the invention is explained in detail with respect to the drawings, in which:

FIG. 1 is a side view of an installation for producing a multi-layer compound tube, FIG. 2 is a side view of the molding and trimming device for the metallic band required for the production of the multi-layer compound tube according to FIG. 1, FIGS. 3 through 5 are cross-sectional views of the metallic band at the level of the planes III—III, IV—IV and V—V of FIG. 2, FIGS. 6 through 8 are cross-sectional views of the inner tube at the level of the planes VI—VI, VII—VII and VIII—VIII of FIG. 1 with a metallic band arranged therearound or sitting close thereon, FIG. 7 also showing the molding tools for holding the metallic band in the state of mutually abutting projecting longitudinal edges in the welding station.

DESCRIPTION OF THE PREFERRED EMBODIMENTS

Figure 10:
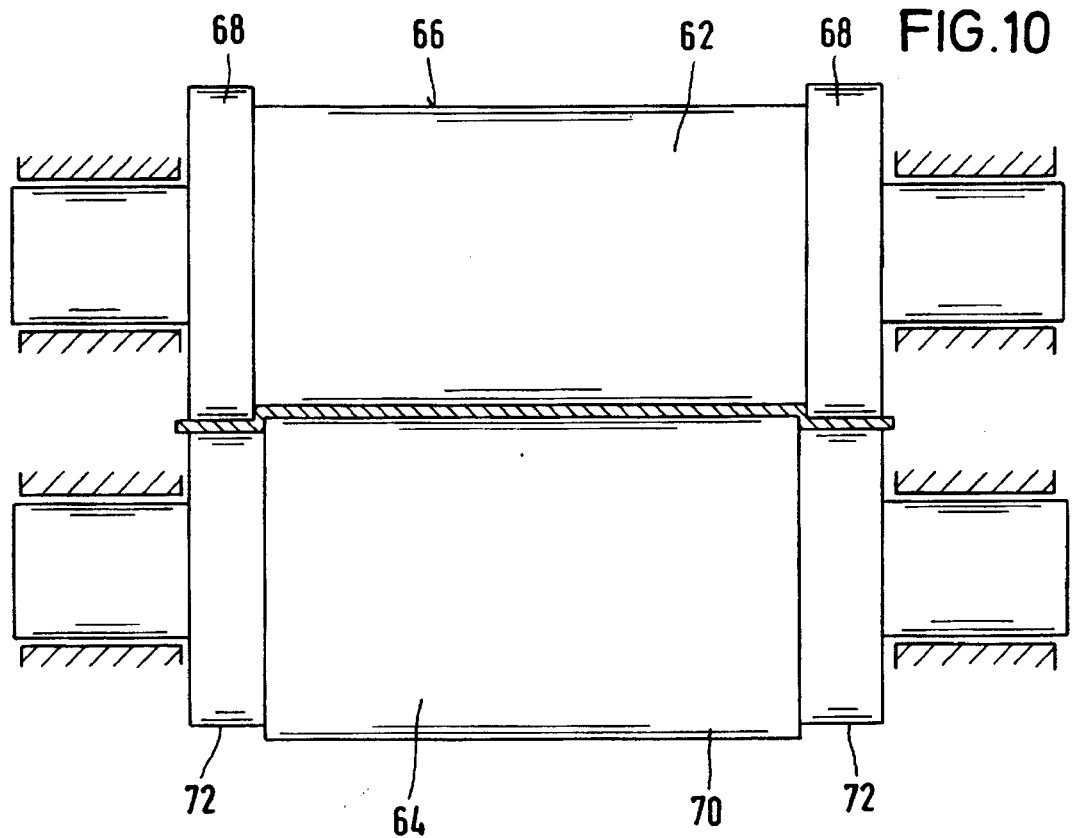
FIGS. 10 and 11 show cross sections through a pair of molding rolls and a pair of trimming rolls of the molding and trimming device along the planes X—X and XI—XI of FIG. 2.

FIG. 1 shows, in extremely schematized form, an installation 10 for producing a multi-layer compound tube 12 comprising a plastic inner tube 14, a metal sheathing 16 for the plastic inner tube 14 and an outer plastic tube 18 applied on the outside of the metal sheathing 16. For the metal sheathing 16, a metallic band 20 is used which is provided with projecting longitudinal edges in a molding and trimming device 22. This molding and trimming device 22 is shown in FIG. 2 in side view and also in extremely schematized form. Further details of the individual stations of the device 22 can be seen in FIGS. 10 and 11 reference to which is made later on.

Figure 7:
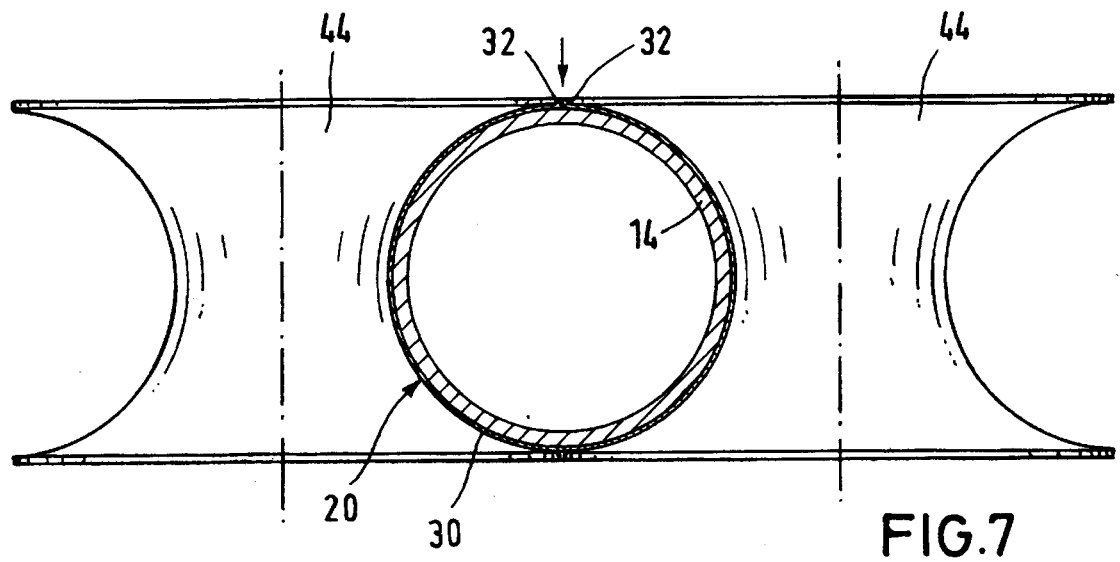
Figure 8:
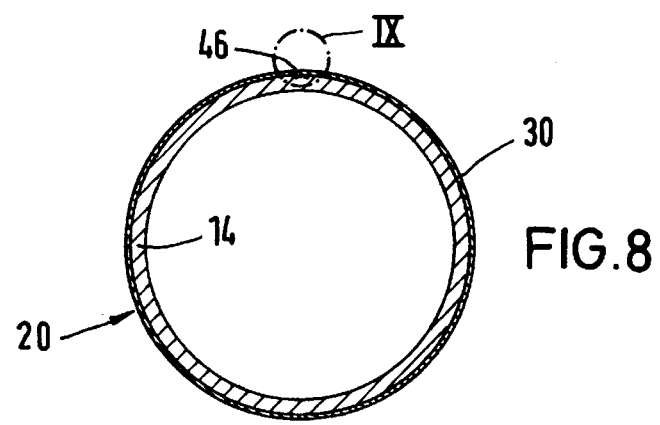

In order to produce the compound tube 12, the installation 10 is operated in a manner known per se as follows. First, the plastic inner tube 14 is extruded by means of an extruder 24. By means of another extruder 26, a plastic layer as adhesive 27 is applied from the outside onto this inner tube 14. From the side, from below or from above, an (aluminum) metallic band 20 is supplied downstream of the extruder, which is laid around the inner tube 14 from the outside by means of roll molding stations 28. The speed at which the metallic band 20 is supplied is chosen to be synchronous with the speed at which the inner tube 14 is extruded. As can be seen from FIG. 6, the metallic band 20 comprises a middle section 30 on the longitudinal sides of which projecting longitudinal edges 32 are arranged. By means of the roll molding stations 28, this metallic band 20 is brought into engagement with the inner tube 14 and laid therearound in such a manner that the longitudinal edges 32 projecting at about 90° are brought into mutual abutment. The longitudinal edges 32 abutting each other in such a manner substantially project radially from the inner tube 14 and are welded together in a welding station 34. This welding is described in more detail further below with reference to FIGS. 7 through 9. Following the longitudinal seam welding (the longitudinal edges 32 of the metallic band 20 contacting each other extend in an axial direction of the inner tube 14 and the compound tube 12, respectively), another plastic layer is deposited as an adhesive 38 onto the metal sheathing 16 by means of an extruder 36. By means of another extruder 40, the plastic layer for the plastic outer tube 18 is then extruded onto the adhesive layer 38. By measures known per se, the adhesive layers 27 and 38 are activated and the plastic layers for the outer and inner tubes 18,14 are cross-linked. This will not be described in more detail here.

Figure 9:
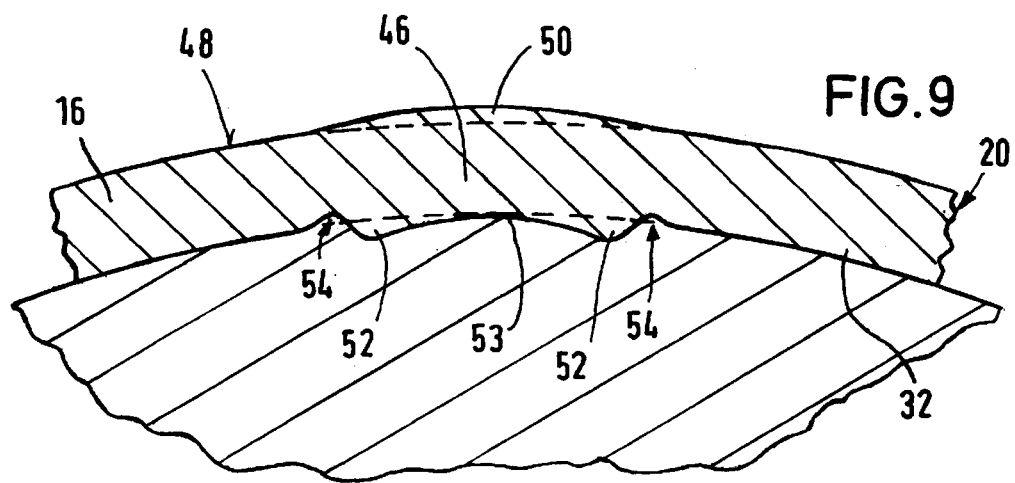
FIG. 9 shows an enlarged illustration of the weld seam corresponding to the portion encircled at IX in FIG. 8, the root formation of the weld seam and the flat protrusion on the outside being recognizable.

As already mentioned above, the metallic band 20 is laid around the inner tube 14 such that it abuts all-over on the outer surface of the inner tube 14 and the adhesive layer 27 in the middle section 30 thereof, and the inner surfaces 42 (FIG. 6) of the longitudinal edges 32, which are facing each other in this state (FIG. 6) and form the outer surfaces when the metallic band 20 is stretched straight, contact each other. By means of corresponding molding or molding holding rolls 44, the metallic band 20 is held in this state while the longitudinal edges 32 are welded together. The welding energy per advance unit path released by the welding station 34 as well as the material amount (welding volume) provided by the longitudinal edges are chosen such that the radial protrusion of the longitudinal edges 32 existing prior to welding exists no longer after the welding, i.e. that the outer contour of the weld seam 46 is approximated to the outer contour of the metal sheathing 16 in the remaining region of the metallic band 20. FIG. 9 shows a cross section through the weld seam 46 on an enlarged scale. Here, it can be seen that the weld seam 46 has a slight protrusion 50 on its outside and substantially fits into the outer peripheral surface 48 of the metal sheathing 16 formed from the metallic band 20. In FIG. 9, the peripheral surface 48 is added in broken lines in the region of the protrusion 50 of the weld seam 46. On the inside of the weld seam 46, the root comprising two inner protrusions 52 on both lateral sides of the weld seam and an intermediate deepening 53 can be seen. The transition of the inner protrusions 52 of the root to the middle section 32 of the metallic band 20 is provided with slight notches 54 whose depth as well as the inner protrusions 52 and the deepening 53 is determined by the welding volume and the welding energy. By choosing the welding energy and the welding volume (height of the longitudinal edges 32 and thickness of the metallic band 20), the metallic band 20 can be welded together at its longitudinal edges 32 such that the welding seam 46, the root formation thereof being sufficiently marked, comprises an outer contour being adapted to the outer contour of the metal sheathing 16, with a mechanically reliable transition and connection to the metallic band 20. No mechanical finishings of the weld seam 46 or the metal sheathing 16 itself are necessary. This has a decisive effect on a reduction of production costs, since, on the one hand, method or treatment steps can be saved and, on the other hand, thinner metallic bands can be used on account of the possibility to reliably weld the metal sheathing together.

Figure 11:
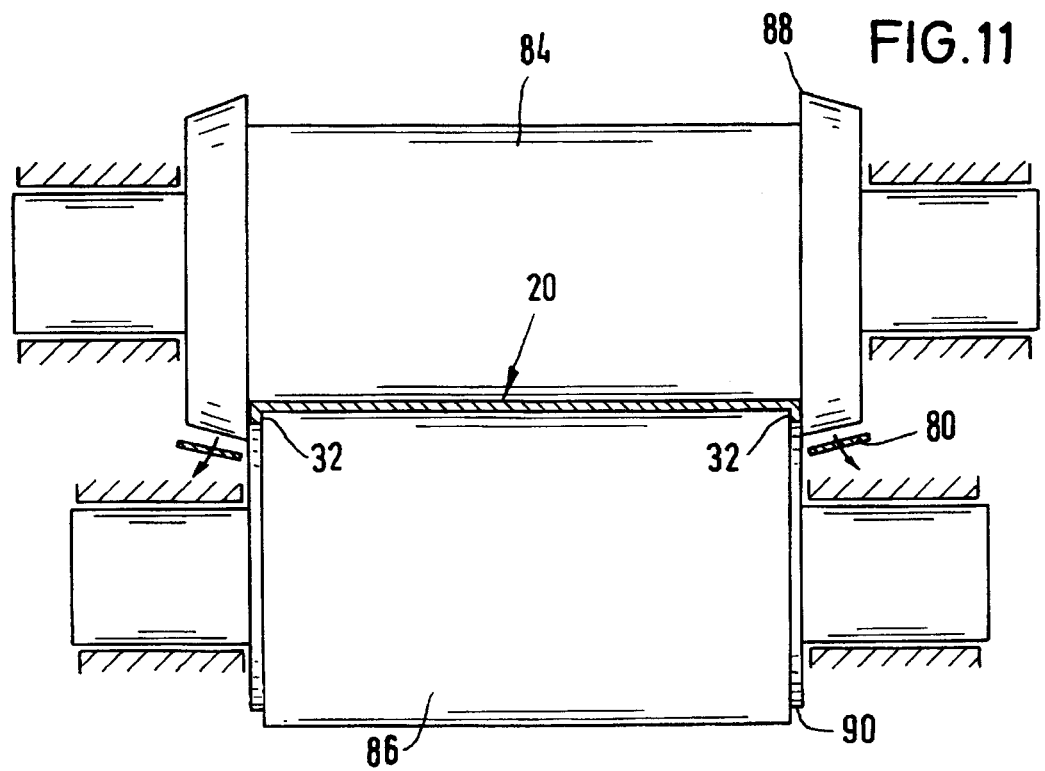

Hereinafter, the method for producing a metallic band with bent longitudinal edges is to be explained with respect to FIGS. 2 through 5 and FIG. 10 as well as FIG. 11. Starting from a flat plane broader metallic band 56 wound on a coil 58 (see FIG. 2), this metallic band 20 is molded. In a roll molding station, the metallic band 56 is given the profile shown in cross section in FIG. 4. The roll molding station 60 comprises two molding rolls 62, 64 which engage on the metallic band 56 from both sides (i.e. from above and from below) and comprise complementary peripheral surfaces. By introducing the metallic band 56 into the clearance between the two molding rolls 62, 64 supported so as to be rotatable about parallel axes, the metallic band 56 is pressed and thus molded, so that it obtains a cross section according to FIG. 4. While the molding roll 62 comprises a deepening 66 extending almost over the entire axial length and having step-like raised parts 68 at the axial ends, the peripheral surface of the molding roll 64 is provided with a peripheral raised part 70 and axial ends 72 which are both stepped and reduced in diameter. The flat middle section 74 having, on both sides thereof, adjacent L-shaped flanges 76 on the longitudinal sides of the metallic band 56 is characteristic for the profile or cross section of the metallic band 56. Each L-shaped flange 76 comprises a first short leg 78 connected to the middle section 74 and projecting therefrom at substantially right angles. Adjacent to this short leg 78 (also referred to as angular section), there is a second longer leg 80 (hereinafter also referred to as edge section) extending parallel to the middle section 74 and being offset in height with respect to the middle section 74 by the length of the angular section 78.

The metallic band 56 molded in such a manner by pressing is supplied to a trimming station 82 comprising rolls 84, 86 engaging on the metallic band 56 from both sides. The roll 84 which—as shown in FIG. 4—engages on the metallic band 56 from above comprises radially projecting circumferential cutting edges 88 arranged on both sides of the angular sections 78 and serving for cutting the edge sections 80 of the L-shaped flanges 76. While the upper (trimming) roll 84 comprises a recessed middle peripheral surface and adjacent to both sides thereof the projecting cutting edges 80, the lower roll 86 (counter roll) is provided with a stepping 90 at its axial ends. The dimension of the stepping 90 is chosen such that the roll 86 engages on the angular sections 78 and additionally engages on the longer leg 80 of the L-shaped flange 76 by a distance equal to the size of the metallic band. Thus, the surface resulting from the stepping and the remaining peripheral surface of the roll 86 form an abutment surface in the region of the angular sections 78 in order to support the metallic band 56 during trimming. The profile of the cut metallic band 56 is shown in FIG. 5, the separated edge sections 80 being shown in broken lines. This profile of the metallic band corresponds to the metallic band 20 already described above, which then, in this embodiment, is guided towards the plastic inner tube from below and laid therearound, which has already been described above. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for sheathing a plastic tube with a metal sheathing comprising the steps of:

forming a metallic band from a metallic blank, the band having an intermediate section and two longitudinal edges, each of said edges being bent to project away from a common side of the intermediate section, including molding L-shaped flanges on each of two longitudinal edge portions of the metallic blank, a first leg of each L-shaped flange projecting from a middle section of the metallic blank, a second leg of said each L-shaped flange extending from each said first leg in parallel to the middle section, and separating the second legs from the first legs, so that the first legs are the edges of the band, wrapping the metallic band (20) around a plastic tube, the metallic band (20) comprising longitudinal edges (32) bent to a common side of the metallic band to form the metal sheathing, said wrapping including abutting the edges to each other to extend substantially parallel to the longitudinal axis of the plastic tube when the metallic band is wrapped around the plastic tube, and welding the two edges to each other to form a longitudinal weld seam, wherein the material volume of the edges and the welding energy are selected such that the metallic band welded together at its edges comprises, in the region of the longitudinal weld seam, an outer surface located substantially within the virtual extension line of the outer peripheral surface of the metal sheathing after welding.

2. The method according to claim 1, wherein the first and second angles are each about 90°.

3. The method according to claim 1, wherein the outer surface of the longitudinal weld seam slightly protrudes outward beyond the virtual extension line of the outer peripheral surface of the metal sheathing after welding.

4. The method according to claim 1, wherein the step of welding the longitudinal weld seam includes producing on an inner peripheral surface of the metallic sheathing two protrusions with a depression therebetween.

5. The method according to claim 1, wherein the step of separating said each second leg is effected by using a pair of trimming rolls having a cutting roll and a counter roll, the cutting roll engaging on the middle section and on one of the first legs and the counter roll engaging on the middle section, said one of the first legs, and, for a distance equal to the thickness of the metallic blank, on one of the second legs.

6. The method according to claim 1, wherein the outer surface of the longitudinal weld seam extends no more than ⅕ of a thickness of the metallic band outward beyond the virtual extension line of the outer peripheral surface of the metal sheathing after welding.

7. The method according to claim 1, wherein the said one and the other of said edges are at a first angle and a second angle to the intermediate middle section, the sum of the first and second angles being about 180°.

8. The method according to claim 7, wherein the first and second angles are each about 90°.

9. The method according to claim 1, wherein the forming step further includes guiding a metallic blank having two longitudinal edges into the clearance between the peripheral surfaces of first and second molding rolls of at least one pair of rolls prior to molding the L-shaped flanges, the molding rolls comprising complementary peripheral molding surfaces for engaging the metallic blank on both sides thereof.

10. The method according to claim 9, wherein said first molding roll has a circumferential raised central part and said second molding roll has a circumferential central depression in their respective peripheral molding surfaces.

* * * * *